No. 788,475. PATENTED APR. 25, 1905.
B. F. KENNEDY.
SEED DROPPER AND PLANTER.
APPLICATION FILED JULY 1, 1904.

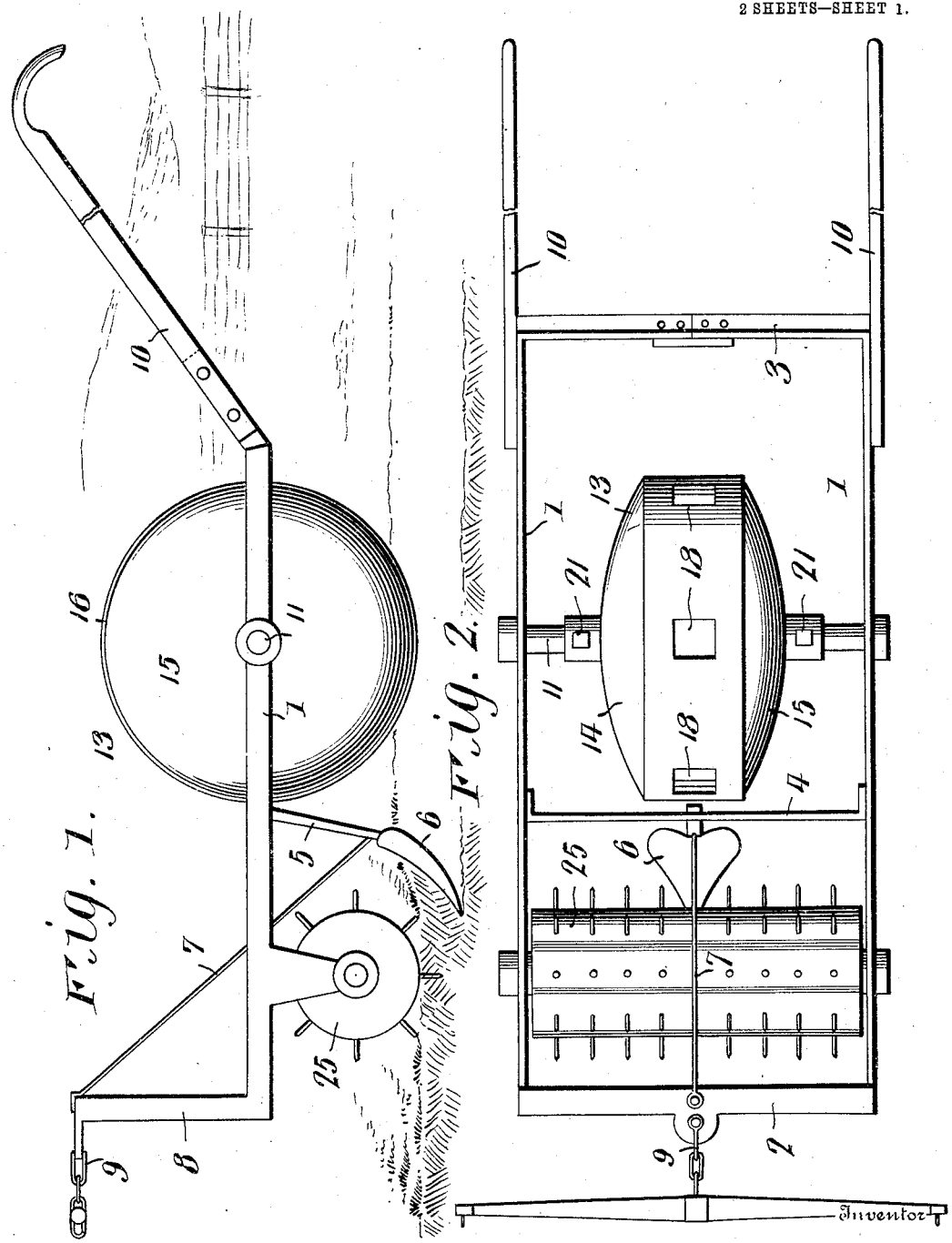

2 SHEETS—SHEET 2.

Witnesses
F. W. Riley
Chas C. Blakestone

Inventor
Barham F. Kennedy.

By Victor J. Evans
Attorney

No. 788,475. Patented April 25, 1905.

UNITED STATES PATENT OFFICE.

BARHAM FOSTER KENNEDY, OF JONESVILLE, SOUTH CAROLINA.

SEED DROPPER AND PLANTER.

SPECIFICATION forming part of Letters Patent No. 788,475, dated April 25, 1905.

Application filed July 1, 1904. Serial No. 214,947.

*To all whom it may concern:*

Be it known that I, BARHAM FOSTER KENNEDY, a citizen of the United States, residing at Jonesville, in the county of Union and State of South Carolina, have invented new and useful Improvements in Seed Droppers and Planters, of which the following is a specification.

This invention relates to seed droppers and planters, the object of the invention being to provide a simple, effective, and reliable seed dropping and planting machine having provision whereby the spaces between the hills may be regulated to suit the requirements or desires of the farmer and whereby the number of seeds may be increased or diminished to suit conditions.

The machine embodies a rolling hopper with peripheral discharge-openings; and a further object of this invention is to so construct and arrange the parts of the hopper that the seed will be thoroughly agitated and loosened in the rolling motion of the hopper and prevented from jamming and congesting within the hopper, so as to interfere with the discharge of the seed through the openings in the periphery thereof.

With the above and other objects in view, the nature of which will more fully appear as the description proceeds, the invention consists in the novel construction, combination, and arrangement of parts, as herein fully described, illustrated, and claimed.

Figure 3:
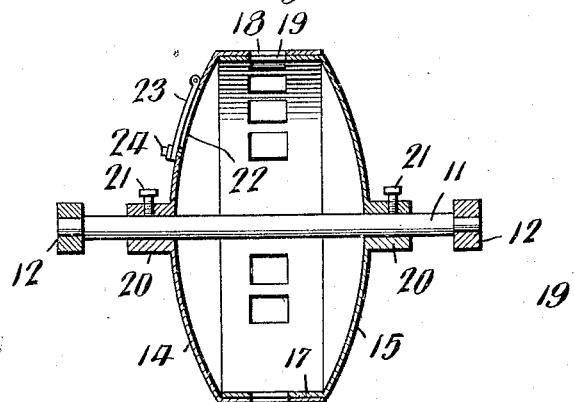
Figure 6:
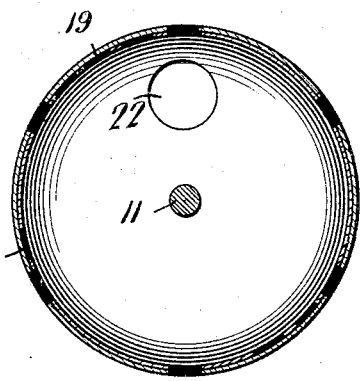
Figure 4:
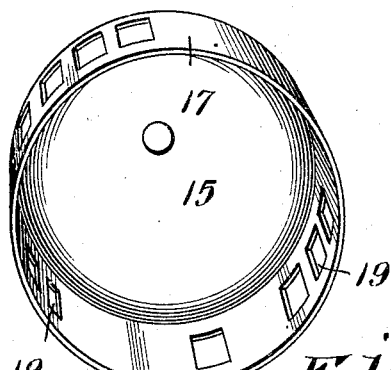
Figure 5:
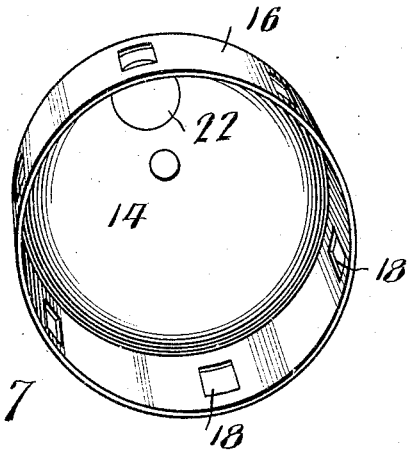
Figure 7:
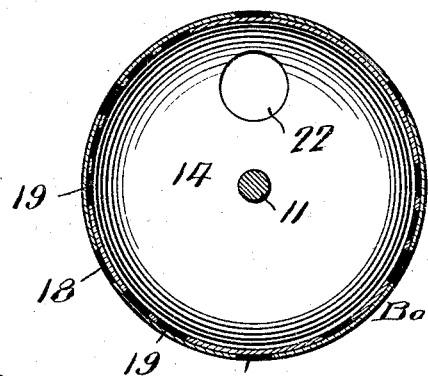

In the accompanying drawings, Figure 1 is a side elevation of a seed dropper and planter embodying the present invention. Fig. 2 is a plan view of the same. Fig. 3 is a transverse section through the hopper, taken in line with the axle. Fig. 4 is a detail perspective view of one of the hopper-sections. Fig. 5 is a similar view of the other hopper-section. Figs. 6 and 7 are vertical sections through the hopper, illustrating different adjustments for obtaining a greater or lesser number of discharge-openings.

Like reference-numerals designate corresponding parts in all the figures of the drawings.

The frame of the machine comprises the longitudinal side bars 1, connected by front and rear cross-bars 2 and 3, respectively, and an intermediate cross-bar 4, to which a standard 5 is secured, said standard carrying a furrow-opener 6 at its lower end and being braced by means of an inclined stay-rod 7, which extends forward and connects to the forward cross-bar 2, which is held at a suitable elevation above the longitudinal bars 1 by means of uprights 8 at the forward ends of the side bars 1. At the forward end the frame is provided with a suitable clevis 9 for hitching the draft-animals, and at the rear the frame is provided with upwardly and rearwardly inclined handle-bars 10, which are grasped by the operator walking in rear of the machine.

Mounted upon an axle 11, extending transversely across the frame and journaled in suitable bearings 12 thereon, is a rolling hopper 13, which is composed of interfitting sections 14 and 15. The section 14 is provided with a cylindrical rim 16, forming the periphery of the hopper, while the section 15 is provided with a similar rim 17 of sufficiently less diameter to adapt it to fit within the rim 16, as clearly illustrated in Fig. 3. The side wall of each section 14 and 15 is outwardly dished or made substantially concavo-convex, as shown in Fig. 3, so that when the two sections are combined in the manner shown in said figure the central portion of the hopper is considerably greater in width than the peripheral or outer portion thereof, the result being that the seeds gravitate inward toward the lowermost discharge-openings, hereinafter referred to. Another advantage resulting from the particular shape of the hopper resides in the fact that as the seeds are carried upward in the hopper they fall by gravity toward the axle, thus effecting a thorough loosening and agitation of the seeds, which prevents the jamming or congestion of the seeds within the hopper, thus insuring their discharge at the proper time and in the proper quantity.

The rim 16 is provided with a series of discharge-openings 18, arranged at equal intervals, as shown in Fig. 5, and any desired number of such openings may be provided, six of such openings being shown for the purposes of illustration. The other rim, 17, is provided with a greater number of discharge-openings 19, and the openings 19 are so arranged that by partially revolving the rims 16 and 17 one upon the other all of the openings 18 may register with a corresponding number of openings 19 or only a portion of the openings 18 be allowed to register with a corresponding number of openings 19. In this way the hopper as a whole may be set so as to expose a single opening or two or three or more openings up to the entire number contained in the rim 16. By the means described the frequency of the hills or the intervals between the hills may be regulated to suit requirements. In order to provide for the adjustment just described, each of the sections 14 and 15 is provided with a hub 20, extending outwardly therefrom and receiving a set-screw 21, adapted to bear against the axle 11. By loosening one of said set-screws the section corresponding therewith may be turned relatively to the other section for properly adjusting the discharge-openings, after which the screw 21 is tightened and the sections 14 and 15 will then rotate in unison. One of the sections is provided with a filling-opening 22, which is normally covered by a lid 23, attached to said section and provided with suitable fastening means 24.

In front of the rolling hopper 13 is arranged a spiked roller 25, which operates to smooth and roll down the soil and at the same time loosen the surface thereof in advance of the rolling hopper and also in advance of the furrow-opener 6. In some cases the furrow-opener 6 may be dispensed with, so that the rolling hopper 13 may operate directly after the spiked roller 25.

By means of the relative adjustment between the hopper-sections the discharge-openings thereof may be also diminished in size for the purpose of regulating the quantity of seed discharged through said openings. This may be done either by partially turning one section with respect to the other or by adjusting one section laterally with respect to the other or longitudinally upon the axle 11.

The machine in its general organization of parts is susceptible of changes in the form, proportion, and minor details of construction which may be accordingly resorted to without departing from the principle or sacrificing any of the advantages of the invention.

Having thus described the invention, what is claimed as new is—

In a seed-planter, the combination with a frame having supporting means and furrow-opening means, of an axle, a pair of interfitting sections on said axle, the distance of the axle above the ground being such as to cause the sections to contact with and roll upon the ground, each section having a cylindrical rim formed with discharge-openings, and having an outwardly-dished side wall, the cylindrical rim of one section fitting into the cylindrical rim of the other section, a hub attached to the outwardly-dished wall of each section and surrounding the axle, and a set-screw extending through each of the hubs for adjusting the dished sections longitudinally upon the axle.

In testimony whereof I affix my signature in presence of two witnesses.

BARHAM FOSTER KENNEDY.

Witnesses:
T. PERRIN KENNEDY,
ALBERT S. KENNEDY.